USO11112855B1

United States Patent
Kuo et al.

(10) Patent No.: US 11,112,855 B1
(45) Date of Patent: Sep. 7, 2021

(54) ELECTRONIC DEVICE AND ASSOCIATED CONTROL METHOD FOR REDUCING POWER CONSUMPTION

(71) Applicant: Silicon Motion, Inc., Hsinchu County (TW)

(72) Inventors: Kuo-Cyuan Kuo, Tainan (TW); Chih-Chiang Chen, Taichung (TW); I-Ta Chen, New Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 16/884,055

(22) Filed: May 27, 2020

(30) Foreign Application Priority Data

Mar. 9, 2020 (TW) .................................. 109107706

(51) Int. Cl.
*G06F 1/3296* (2019.01)
*G06F 13/42* (2006.01)
*G06F 1/04* (2006.01)

(52) U.S. Cl.
CPC .............. *G06F 1/3296* (2013.01); *G06F 1/04* (2013.01); *G06F 13/4221* (2013.01); *G06F 2213/0026* (2013.01)

(58) Field of Classification Search
CPC .................... G06F 1/04; G06F 13/4221; G06F 2213/0026; G06F 1/3296
See application file for complete search history.

(56) References Cited

U.S. PATENT DOCUMENTS

| 8,656,196 B2 | 2/2014 | de Cesare | |
|---|---|---|---|
| 9,996,135 B2 | 6/2018 | Wells | |
| 2008/0150645 A1 | 6/2008 | McCorquodale | |
| 2015/0067361 A1 | 3/2015 | Rusu | |
| 2015/0095670 A1* | 4/2015 | Reddy | G06F 1/3243 713/320 |
| 2015/0378423 A1* | 12/2015 | Hanssen | G06F 1/3296 713/323 |
| 2019/0041936 A1* | 2/2019 | Teoh | G06F 13/4282 |
| 2020/0371578 A1* | 11/2020 | Murali | G06F 1/3278 |

FOREIGN PATENT DOCUMENTS

TW 201907312 A 2/2019

* cited by examiner

*Primary Examiner* — Glenn A. Auve
(74) *Attorney, Agent, or Firm* — Winston Hsu

(57) ABSTRACT

An electronic device comprises a clock request pad, a multiplexer and a control circuit. The clock request pad is arranged to refer to a first control signal to operate under a low voltage level or a high voltage level, to indicate whether the electronic device needs a clock signal generated from a clock generation circuit external to the electronic device. Said multiplexer is arranged to refer to a second control signal to output one of a voltage level of the clock request pad and a predetermined voltage level to function as a multiplexer output signal. The control circuit is coupled to said multiplexer, and refers to said multiplexer output signal to determine whether to control the electronic device to operate in a power-saving mode.

14 Claims, 2 Drawing Sheets

ELECTRONIC DEVICE AND ASSOCIATED CONTROL METHOD FOR REDUCING POWER CONSUMPTION

BACKGROUND OF THE INVENTION

1. Field of the Invention

The present invention relates to an electronic device, and more particularly, to an electronic device having a Peripheral Component Interconnect Express (PCIe) interface.

2. Description of the Prior Art

The latest PCIe specification defines a clock request signal (CLKREQ#), in which if a PCIe device needs to obtain a clock signal from a host device to perform operations, the PCIe device may set the clock request pad thereof to a low voltage level. When detecting that the clock request pad of the PCIe device has the low voltage level, the host device may request a clock generation circuit to generate a clock signal to the PCIe device. In another aspect, if the PCIe device needs to enter a power-saving mode or a sleep mode without the need of using a clock signal, the PCIe device may set the clock request pad thereof to a high voltage level, and when detecting that the clock request pad of the PCIe device has a high voltage level, the host device may request the clock generation circuit to stop generating clock signals to the PCIe device, and the PCIe device may decide whether to enter the power-saving mode through detecting the clock request pad thereof.

Under the current design of motherboards and PCIe devices, the host device installed onto the motherboard as well as one or more PCIe devices all have a clock request pin. These clock request pins are all connected to each other on the motherboard. Therefore, not until the motherboard and all PCIe devices set the respective clock request pins to a high voltage level may these devices enter the power-saving mode. In other words, if any of the host device and said one or more PCIe devices needs a clock signal and therefore set the clock request pin thereof to a low voltage level, all clock request pins and the connection paths thereof will have the low voltage level, making the rest of PCIe devices that needs to enter the power-saving mode unable to enter the power-saving mode.

In another aspect, since old versions of the PCIe specification do not define clock request pins, old PCIe devices or the host device might keep receiving clock signals. One thing to be noted is that the old PCIe devices or the host device may also have a pin similar to the clock request pin. The only difference is that the voltage level of this pin remains in the low voltage level. Therefore, if the motherboard includes an old host device or a PCIe device, since the aforementioned pin of the old PCIe device or the host device is connected to the clock request pin of another new PCIe device on the motherboard, the new PCIe device will be pulled down to the low voltage level by the old PCIe device, and therefore unable to enter the power-saving mode.

SUMMARY OF THE INVENTION

In view of the above, an objective of the present invention is to provide an electronic device capable of entering the power-saving mode under the situation where other PCIe devices do not support the clock request pin function, thereby solving the problems encounter in related art techniques.

An embodiment of the present invention discloses an electronic device that comprises a clock request pad, a multiplexer and a control circuit. The clock request pad is arranged to refer to a first control signal to operate under a low voltage level or a high voltage level, to indicate whether the electronic device needs a clock signal generated from a clock generation circuit external to the electronic device. Said multiplexer is arranged to refer to a second control signal to output one of a voltage level of the clock request pad and a predetermined voltage level to function as a multiplexer output signal. The control circuit is coupled to said multiplexer, and refers to said multiplexer output signal to determine whether to control the electronic device to operate in a power-saving mode.

Another embodiment of the present invention discloses a control method of an electronic device. The method comprises: generating a first control signal to a clock request pad to make the clock request pad have a low voltage level; receiving a clock signal generated from a clock generation circuit external to the electronic device to perform operations; generating a second control signal to output one of a voltage level of the clock request pad and a predetermined voltage level to function as a multiplexer output signal; and referring to said multiplexer output signal to determine whether to control the electronic device to operate in a power-saving mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
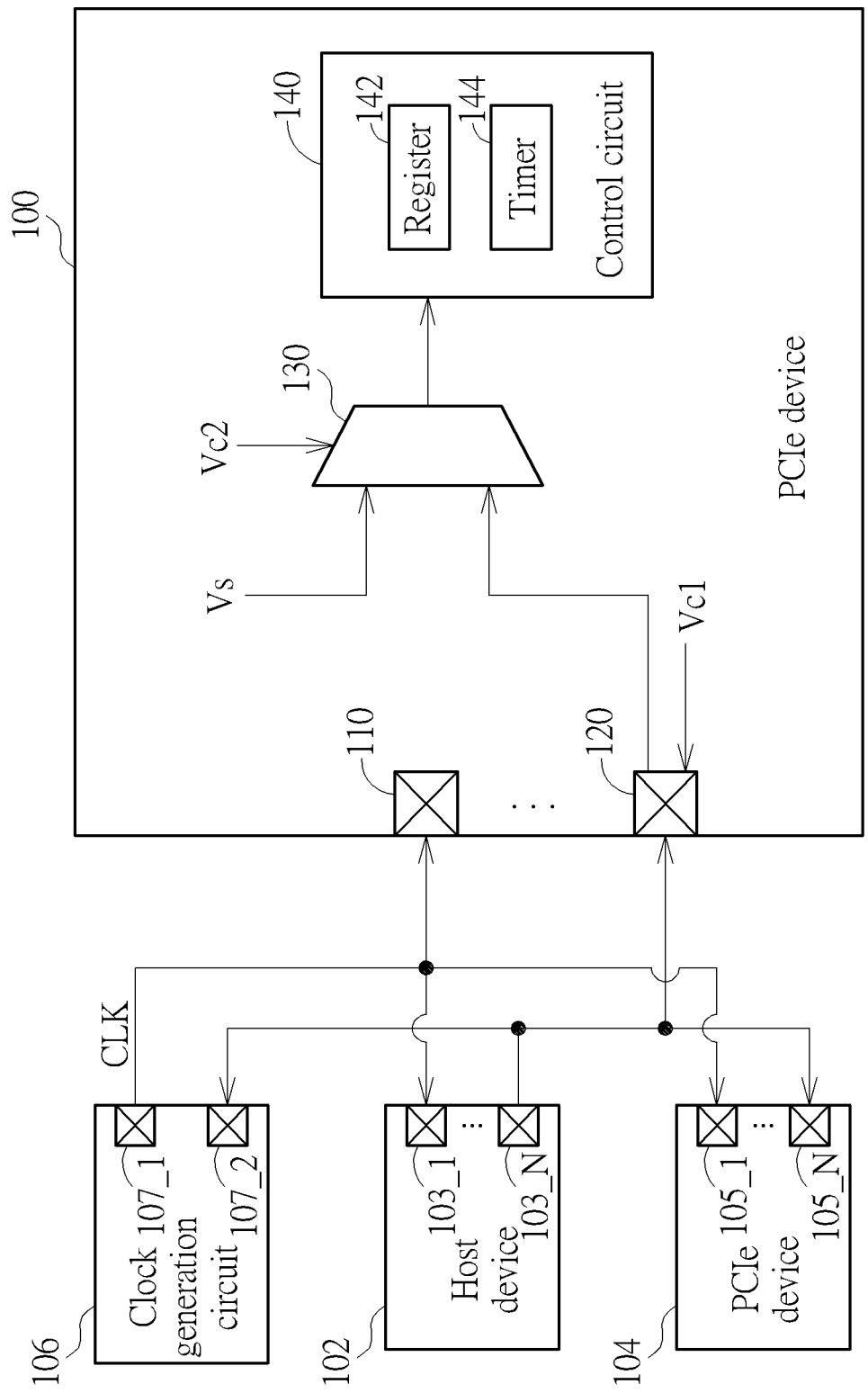
FIG. 1 is a diagram illustrating an electronic device according to an embodiment of the present invention.

FIG. 1 is a diagram illustrating an electronic device according to an embodiment of the present invention, wherein an electronic device in this embodiment is a PCIe device 100. As shown in FIG. 1, the PCIe device 100 comprises multiple contacting points, a multiplexer 130 and a control circuit 140, wherein said multiple contacting points at least comprises a clock request pad 120 and a clock signal contacting point 110, and the control circuit 140 comprises a register 142 and a timer 144. In this embodiment, the PCIe device 100 may be installed onto a motherboard, and a host device (e.g. a processor) 102, another PCIe device 104 (e.g. a graphic card or a solid state drive (SSD)) and a clock generation circuit 106 may be further installed onto the motherboard, wherein the host device 102 comprises multiple contacting points 103_1-103_N, the PCIe device 104 comprises multiple contacting points 105_1-105_N, and the clock generation circuit 106 comprises at least two contacting points 107_1 and 107_2. The clock request pad 120 of the PCIe device 100, the contacting point 103_N of the host device 102, the contacting point 105_N of the PCIe device 104, and the contacting point 107_2 of the clock generation circuit 106 are interconnected on the motherboard.

In the basic operations of the PCIe device 100, if the PCIe device 100 needs to use the clock signal to perform operations, the control circuit 140 in the PCIe device 100 will generate a first control signal Vc1 to pull the clock request pad 120 down to a low voltage level (e.g. by electrically connecting the clock request pad 120 to 0V or a ground voltage level). Meanwhile, since the contacting point 120 of the PCIe device 100, the contacting point 103_N of the host device 102, the contacting point 105_N of the PCIe device 104 and the contacting point 107_2 of the clock generation circuit 106 are all interconnected on the motherboard, when the host device 102 or the clock generation circuit 106 detects that the contacting point 103_N or the contacting point 107_2 has a low voltage level, a clock signal CLK will be generated to the contacting point 110 of the PCIe device 100, the contacting point 103_1 of the host device 102 and the contacting point 105_1 of the PCIe device 104, so as to be used by these devices. The frequency of the clock signal CLK may be 100 MHz, and after the PCIe device 100 receives the clock signal CLK, an inner circuit will be utilized to generate a high frequency clock signal (e.g. 2.5 GHz) to be used by the inner circuit. In another aspect, if the PCIe device 100 may enter the power-saving mode (e.g. the L1 PM substrates mentioned in the PCIe specification), the control circuit 140 will generate the first control signal Vc1 to set the clock request pad 120 to a high voltage level (e.g. 3.3V or 1.8V). Hence, in the operations of a traditional PCIe device (i.e. operations other than those in this embodiment), the control circuit 140 detects whether the clock request pad 120 has a high voltage level or not, and only when the clock request pad 120 is detected as having a high voltage level, will the control circuit 140 make the PCIe device 100 enter the power-saving mode.

However, the mechanism of the aforementioned traditional PCIe device for determining the timing for entering the power-saving mode is very likely, from start to finish, unable to enter the power-saving mode because the host device 102 does not support the power-saving function, or because any of the host device 102 and the PCIe device 104 is an old-type PCIe device that does not support the clock request (CLKREQ#).

Specifically, for the old-type host device 102, the contacting point 103_N of the clock request pad 120 that is connected to the PCIe device 100 will continuously have a low voltage level; and for the old-type PCIe device 104, the contacting point 105_N of the clock request pad 120 that is connected to the PCIe device 100 will also continuously have a low voltage level. Meanwhile, no matter whether these devices need the clock signal CLK or not, the clock generation circuit 106 will generate the clock signal CLK to these devices. As mentioned above, since traditionally the voltage level of the clock request pad 120 is utilized to determine whether entering the power-saving mode is allowed, under the situation where any of the host device 102 and the PCIe device 104 is an old-type PCIe device that does not support the clock request, traditionally even the new-type PCIe device that supports the clock request can never enter the power-saving mode. In another aspect, since the clock request pad 120 of the PCIe device 100, the contacting point 103_N of the host device 102 and the contacting point 105_N of the PCIe device 104 are mutually connected on the motherboard, if one of the devices needs to use the clock signal CLK from the clock generation circuit 106, all the rest of devices capable of entering the power-saving mode cannot individually enter the power-saving mode.

Therefore, in the design of this embodiment, a multiplexer 130 and its associated circuits are further placed in the PCIe device 100, which may effectively solve the aforementioned problem. The details thereof are described as follows.

It is assumed in a first embodiment that the host device 102 is a device that supports the clock request (i.e. the contacting point 103_N of the host device 102 may be viewed as a clock request pad). During the initialization process after the host device 102 and the PCIe device 100 are powered on, by detecting a power-saving mode function setting (L1 PM substrates capabilities register) stored in the register 142 of the PCIe device 100 and by further writing a power-saving mode control setting (L1 PM substrates control 1 register) into the register 142, the host device 102 may inform that the host device 102 also supports the clock request function. Since the above reading and writing operations of the host device 102 performed upon the register 142 are readily known by one skilled in the art, the details thereof are omitted here for brevity.

Next, after the PCIe device 100 detects the power-saving mode control setting written into the register 142 by the host device 102, the control circuit 140 will generate a second control signal Vc2 to switch the multiplexer 130 to the lower path, i.e. the control circuit 140 may receive the voltage level from the clock request pad 120 through the multiplexer 130. Hence, if the PCIe device 100 needs to use the clock signal to perform operations, the control circuit 140 in the PCIe device 100 will generate the first control signal Vc1 to pull the clock request pad 120 down to the low voltage level, to make the clock generation circuit 106 generates the clock signal CLK for the PCIe device 100 to use. If the PCIe device 100 does not need to use the clock signal to perform operations and may enter the power-saving mode (e.g. via the notification from the host device 102 or other determining mechanisms), the control circuit 140 will generate the first control signal Vc1 in an attempt to set the clock request pad 120 to the high voltage level (e.g. via a pull-up resistor to electrically connect the clock request pad 120 to a supply voltage). Hence, if the host device 102 and PCIe device 104 also respectively set the contacting points 103_N and 105_N to high voltage levels, the control circuit 140 may thereby detect that the clock request pad 120 has a high voltage level, thus allowing the PCIe device 100 to enter the power-saving mode (without the need for using the clock signal CLK from the clock signal generation circuit 106). However, if the host device 102 and the PCIe device 104 do not respectively set the contacting points 103_N and 105_N to high voltage levels, after waiting for a certain period (e.g. by utilizing a timer 144 to countdown), the control circuit 140 may determine that PCIe device 104 may not the support clock request function or the PCIe device 104 still needs to use the clock signal CLK, and thus the control circuit 140 will go on generating the second control signal Vc2 in order to switch the multiplexer 130 to the upper path, i.e. the control circuit 140 receives a predetermined voltage level Vs through the multiplexer 130, in order to control the PCIe device 100 to enter the power-saving mode. In this embodiment, the predetermined voltage level Vs may be set via the firmware in the PCIe device 100, and the predetermined voltage level Vs may be a high voltage level.

As mentioned above, by replacing the voltage level of the clock request pad 120 (i.e. the predetermined voltage level Vs may be viewed as the voltage level of a dummy clock request pad 120) with the predetermined voltage level Vs when the clock request pad 120 cannot be raised to a high voltage level via the first control signal Vc1, the PCIe device 100 may effectively enter the power-saving mode to reduce the power consumption, without the need for modifying the existing determining mechanism of the control circuit 140.

In a second embodiment, assuming that the host device 102 is device that does not support the clock request function, i.e. the contacting point 103_N of the host device 102 is always in low voltage level, during the initialization process after the host device 102 and the PCIe device 100 are powered on, the host device 102 will not detect the power-saving mode function setting (L1 PM substrates capabilities register) stored in the register 142 of the PCIe device 100, and will not further write the power-saving mode control setting (L1 PM substrates control 1 register) into the register 142. Therefore, the PCIe device 100 may be aware of that the host device 102 does not support the clock request function.

Next, the control circuit 140 further generates the second control signal Vc2 to switch the multiplexer 130 to the lower path, i.e. the control circuit 140 may receive the voltage level from the clock request pad 120 through the multiplexer 130. Hence, if the PCIe device 100 needs to use the clock signal to perform operations, the control circuit 140 in the PCIe device 100 will generate the first control signal Vc1 to pull the clock request pad 120 down to a low voltage level, to make the clock generation circuit 106 generate the clock signal CLK for the PCIe device 100. If the PCIe device 100 may enter the power-saving mode (e.g. by using the timer 144 to calculate that the PCIe device 100 has not perform any substantial operation or determining mechanism for a certain period) without the need for using the clock signal to perform operations, the control circuit 140 will generate the first control signal Vc1 in an attempt to set the clock request pad 120 to high voltage level. Meanwhile, the control circuit 140 may go on generating the second control signal Vc2 in order to switch the multiplexer 130 to the upper path, i.e. the control circuit 140 receives the predetermined voltage level Vs which is a high voltage level through the multiplexer 130, in order to make the PCIe device 100 enter the power-saving mode. In this embodiment, the predetermined voltage level Vs may be set via the firmware in the PCIe device 100, and the predetermined voltage level Vs may be a high voltage level.

As mentioned above, by replacing the voltage level of the clock request pad 120 (i.e. predetermined voltage level Vs may be viewed as the voltage level of a dummy clock request pad 120) with the predetermined voltage level Vs when the PCIe device 100 is able to enter the power-saving mode, the PCIe device 100 can effectively enter the power-saving mode to reduce the power consumption, without the need for modifying the existing determining mechanism of the control circuit 140.

It should be noted that traditionally if the host device 102 supports the clock request function and the host device 102 needs to wake up the PCIe device from the power-saving mode, the host device 102 may modify the voltage level of the clock request pad 103_N to wake up the PCIe device 100. In other words, part of the detection circuit within the control circuit 140 that have not entered the sleep mode may continuously detect the voltage level of the clock request pad 120. Once the change of the voltage level of the clock request pad 120 is detected, the normal operation mode will be entered from the power-saving mode. As mentioned above, since the detection circuit in the control circuit 140 may continuously detect the voltage level of the clock request pad 120 and the level of the clock request pad 120 may remain low voltage level even after the PCIe device 100 enters the power-saving mode, during the PCIe device 100 operating in the power-saving mode, the multiplexer 130 remains switched to the upper path. For example, the control circuit 140 may receive the predetermined voltage level Vs with high voltage level through the multiplexer 130 in order to avoid erroneously switching the PCIe device 100 back to the normal operation mode.

As mentioned above, since the PCIe device 100 is unable to receive the voltage level from the clock request pad 120 when operating in the power-saving mode, to make the PCIe device 100 capable of being awakened from the power-saving mode, the control circuit 140 may use the detection circuit that has not entered the sleep mode to detect whether there is a voltage change on other contacting points, in order to determine whether the PCIe device 100 needs to be awakened from the power-saving mode. For example, when the host device 102 needs to send data to the PCIe device 100, the host device 102 may use the mechanism regarding the electrical idle detection defined in the PCIe specification to wake up the PCIe device 100 via a channel within the PCIe interface for transmitting differential signals; or otherwise the control circuit 140 may wake up the PCIe device 100 through detecting whether there is a valid signal from the host device 102.

It should be noted in the above embodiments that although the PCIe device 100 is used as an example, the present invention is not meant to be limited by it. In other embodiments, the embodiment shown in FIG. 1 may be applied to other interfaces that have a clock request pad. Any of this kind of changes shall fall within the scope of the present invention.

Figure 2:
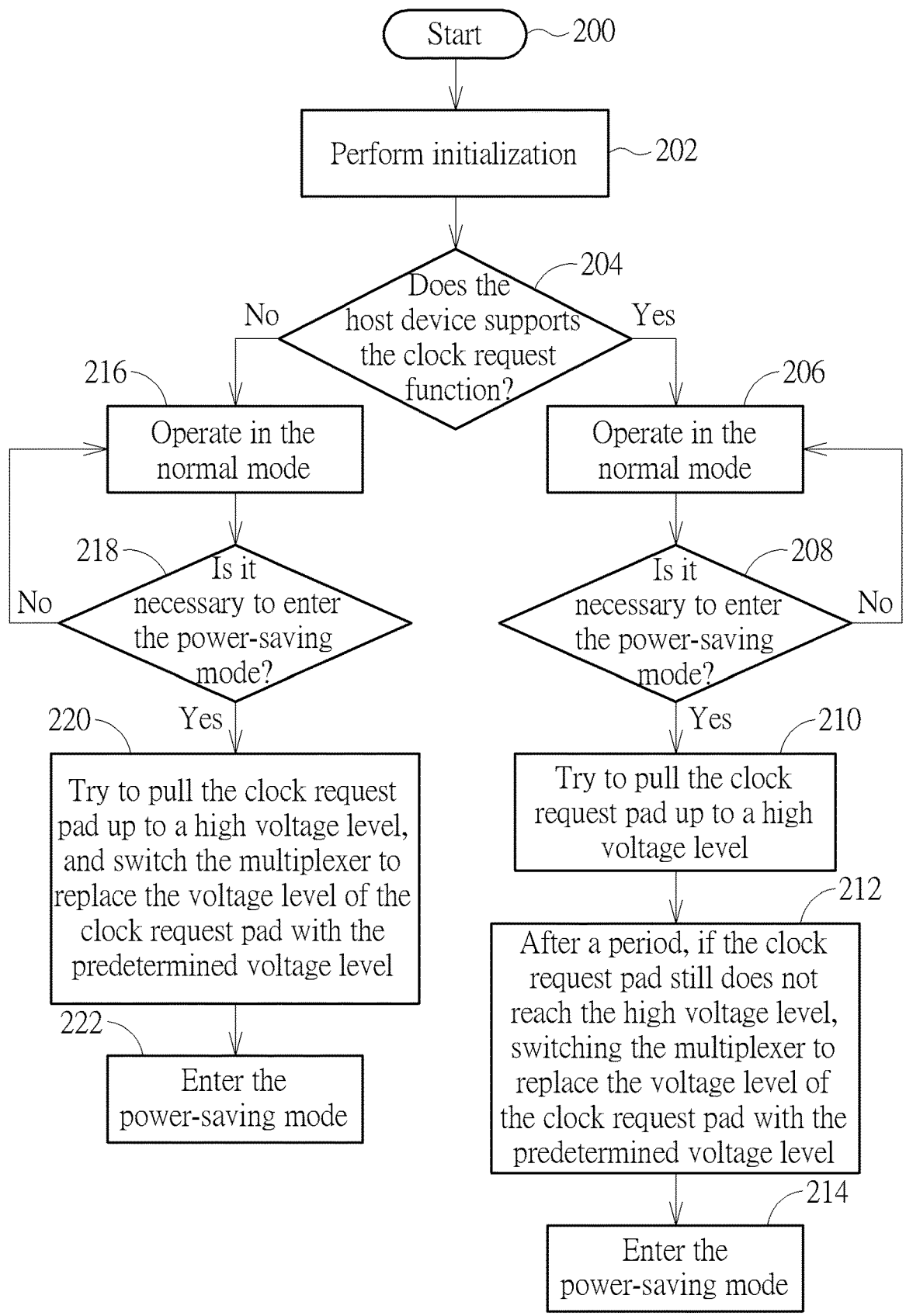
FIG. 2 is a flowchart illustrating a control method of a PCIe device according to an embodiment of the present invention.

FIG. 2 is a flowchart illustrating a control method of a PCIe device 100 according to an embodiment of the present invention. The control method can referenced with the above embodiments, are comprises the following steps.

Step 200: The flow begins.
Step 202: Perform initialization.
Step 204: Determine whether the host device supports the clock request function. If so, the flow goes to Step 206; if not, the flow goes to Step 216.
Step 206: Operate in the normal mode.
Step 208: Determine whether there is a need for entering the power-saving mode. If so, the flow goes to Step 210; if not, the flow goes to Step 206.
Step 210: Try to pull the clock request pad up to a high voltage level.
Step 212: After a period, if the clock request pad still does not reach the high voltage level, switching the multiplexer to replace the voltage level of the clock request pad with the predetermined voltage level.
Step 214: Enter the power-saving mode.
Step 216: Operate in the normal mode.
Step 218: Determine whether there is a need for entering the power-saving mode. If so, the flow goes to Step 220; if not, the flow goes to Step 218.
Step 220: Try to pull the clock request pad up to a high voltage level, and switch the multiplexer to replace the voltage level of the clock request pad with the predetermined voltage level.
Step 222: Enter the power-saving mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An electronic device, comprising:
 a clock request pad, wherein the clock request pad is controlled by a first control signal to have a low voltage level or a high voltage level, to indicate whether the electronic device needs a clock signal generated from a clock generation circuit external to the electronic device or not;

a multiplexer, wherein the multiplexer is controlled by a second control signal to output one of a voltage level of the clock request pad and a predetermined voltage level to function as a multiplexer output signal; and a control circuit, coupled to said multiplexer, the control circuit refers to said multiplexer output signal to determine whether to control the electronic device to operate in a power-saving mode.

2. The electronic device of claim 1, wherein the electronic device is an electronic device having a Peripheral Component Interconnect Express (PCIe) interface.

3. The electronic device of claim 1, wherein when the electronic device needs the clock signal generated from the clock generation circuit to perform operations, the control circuit generates the first control signal to make the clock request pad have the low voltage level, and the control circuit generates the second control signal to make said multiplexer output the voltage level of the clock request pad as said multiplexer output signal; and when the electronic device needs to enter the power-saving mode, the control circuit generates the first control signal in an attempt to control the clock request pad to have the high voltage level.

4. The electronic device of claim 3, wherein when the control circuit generates the first control signal in an attempt to make the clock request pad to have the high voltage level, and if the clock request pad remains in the low voltage level, the control circuit generates the second control signal to output the predetermined voltage level to function as said multiplexer output signal.

5. The electronic device of claim 4, wherein the predetermined voltage level has a high voltage level.

6. The electronic device of claim 3, wherein when the electronic device needs to enter the power-saving mode, the control circuit further generates the second control signal to output the predetermined voltage level to function as said multiplexer output signal.

7. The electronic device of claim 6, wherein the predetermined voltage level has a high voltage level.

8. A control method of an electronic device, comprising:
generating a first control signal to a clock request pad to make the clock request pad have a low voltage level;
receiving a clock signal generated from a clock generation circuit external to the electronic device to perform operations;
generating a second control signal to output one of a voltage level of the clock request pad and a predetermined voltage level to function as a multiplexer output signal; and
referring to said multiplexer output signal to determine whether to control the electronic device to operate in a power-saving mode.

9. The control method of claim 8, wherein the electronic device is an electronic device that has a Peripheral Component Interconnect Express (PCIe) interface.

10. The control method of claim 8, wherein the step of generating the second control signal to output one of the voltage level of the clock request pad and the predetermined voltage level to function as said multiplexer output signal comprises:
when the electronic device needs the clock signal generated from the clock generation circuit to perform operations, generating the second control signal to make said multiplexer output the voltage level of the clock request pad to function as said multiplexer output signal.

11. The control method of claim 10, further comprising:
when the electronic device needs to enter the power-saving mode, generating the first control signal in an attempt to make the clock request pad have high voltage level; and
upon generating the first control signal in an attempt to make the clock request pad have the high voltage level, if the clock request pad remains in the low voltage level, generating the second control signal to output the predetermined voltage level to function as said multiplexer output signal.

12. The control method of claim 10, wherein the predetermined voltage level has a high voltage level.

13. The control method of claim 10, further comprising:
when the electronic device needs to enter the power-saving mode, generating the second control signal to output the predetermined voltage level to function as said multiplexer output signal.

14. The control method of claim 13, wherein the predetermined voltage level has a high voltage level.

* * * * *